United States Patent Office 2,966,452
Patented Dec. 27, 1960

2,966,452
SWEETENING SOUR HYDROCARBON DISTILLATE WITH METAL PHTHALOCYANINE CATALYST IN THE PRESENCE OF ALKALI AIR AND SULFITE IONS

William K. T. Gleim, Island Lake, Ill., assignor to Universal Oil Products Company, Des Plaines, Ill., a corporation of Delaware No Drawing. Filed Feb. 24, 1959, Ser. No. 794,846

5 Claims. (Cl. 208—206)

This invention relates to the treatment of hydrocarbon distillates and more particularly to a novel method of sweetening sour hydrocarbon distillates.

A very effective catalyst for accomplishing the sweetening is a metal phthalocyanine, details of which will be hereinafter set forth. While this catalyst is active and stable, in some cases it has been noted that there is a tendency towards slight deactivation during the sweetening reaction. It now has been found that the activity and stability of the catalyst may be even further improved by the novel method of the present application.

The process of the present invention is particularly applicable to the treatment of petroleum distillates and especially sour gasoline, including cracked gasoline, straight run gasoline, natural gasoline, or mixtures thereof, naphtha, jet fuel, kerosene, aromatic solvent, stove oil, range oil, gas oil, diesel fuel, fuel oil, etc. Other hydrocarbon fractions include lubricating oil, as well as normally gaseous fractions. In still another embodiment the novel features of the present invention may be utilized for purifying other organic fractions containing certain acidic impurities. These organic compounds include alcohols, ketones, aldehydes, etc.

In one embodiment the present invention relates to a process for sweetening a sour hydrocarbon distillate which comprises reacting said distillate with an oxidizing agent in the presence of a phthalocyanine catalyst and sulfite ions.

In a specific embodiment the present invention relates to the process for sweetening sour gasoline which comprises oxidizing mercaptans contained in said gasoline in the presence of caustic solution, cobalt phthalocyanine sulfonate and sodium hydrogen sulfite.

While the present invention may be utilized to effect sweetening of a sour distillate having a comparatively high mercaptan content, in general it is preferred to remove a major proportion of the mercaptans from the distillate. For example, removal of mercaptans from gasoline is preferred rather than conversion of the mercaptans to disulfides and subsequent retention of the disulfides in the gasoline. Sulfur compounds have an unfavorable effect on tetraethyl lead susceptibility. However, conventional treating methods remove from about 50 to about 95% of the mercaptans but leave a product still containing a minor concentration of mercaptans and accordingly a product which is still sour. In a preferred embodiment of the present invention, the final sweetening is effected by oxidizing the mercaptans in the presence of an alkaline reagent, phthalocyanine catalyst and sulfite ions.

Any suitable phthalocyanine catalyst meeting the requirements of high activity and stability during use may be employed in the present invention. Particularly preferred metal phthalocyanines comprise cobalt phthalocyanine and vanadium phthalocyanine. The metal phthalocyanine in general is not readily soluble in aqueous solutions and, therefore, for improved operation is preferably utilized as a derivative thereof. A preferred derivative is the sulfonated derivative. Thus, a particularly preferred phthalocyanine catalyst comprises cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 20% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In a preferred embodiment, the sweetening is effected in the presence of an alkaline reagent. A preferred reagent comprises an aqueous solution of an alkaline metal hydroxide, such as sodium hydroxide solution, potassium hydroxide solution, etc., or these reagents containing a solubilizer or solutizer including, for example, alcohol such as methanol, ethanol, etc., phenols, cresols, etc., tannin, isobutyrate, etc. A particularly preferred alkaline solution is caustic solution comprising an aqueous solution of from about 2 to about 50% and preferably 3 to 30% by weight of sodium hydroxide, and, when employed, a preferred solutizer is methanol which may be used in a concentration of from about 5 to about 200 volume percent of the caustic or other alkaline solution. While the sodium and potassium compounds are preferred, it is understood that other alkaline solutions may be used, including lithium hydroxide, rubidium hydroxide and cesium hydroxide. However, these three last-mentioned compounds generally are more expensive and, accordingly, are not usually used in commercial processes.

As hereinbefore set forth, the phthalocyanine catalyst is very active and quite stable. However, in some cases, as hereinbefore set forth, deactivation occurs during the sweetening reaction. In accordance with the present invention, the activity and stability of the phthalocyanine catalyst are even further improved by effecting the sweetening in the presence of sulfite ions. Any suitable source of sulfite ions may be employed. In one method sulfur dioxide may be bubbled through all or a portion of the reagent composition. In another method suitable sodium sulfites may be dissolved in all or a portion of the reagent compositions. Illustrative sodium sulfites include sodium sulfite ($Na_2SO_3$), sodium sulfite hydrate ($Na_2SO_3 \cdot 7H_2O$), sodium hydrogen sulfite ($NaHSO_3$), sodium hydrosulfite ($Na_2S_2O_4$) or its hydrate ($Na_2S_2O_4 \cdot 2H_2O$), etc. It is understood that these are preferred sodium sulfites and that other suitable sodium sulfites may be employed.

As a general rule, when sodium hydroxide is used as part of the treating reagent, it is preferred to use sulfur dioxide or a sodium sulfite. However, other alkali metal sulfites may be used. When the alkaline reagent used in the treating composition is potassium hydroxide, it generally is desirable to use a potassium sulfite. Illustrative potassium sulfites include potassium sulfite ($K_2SO_3$), its hydrate ($K_2SO_3 \cdot 2H_2O$), potassium hydrogen sulfite ($KHSO_3$), etc. In still other cases, sulfites of ammonium, lithium, rubidium or cesium may be employed. In still other cases the sulfites of alkaline earth metals may be employed including those of magnesium, calcium, strontium and barium. However, as hereinbefore set forth, it generally is preferred to use the sulfite of the same metal in cases where an alkali metal hydroxide is used in the treating reagent composition. It is understood that, when advantages appear therefor, two or more of the sulfites may be employed, either different metal sulfites or different sulfites of the same metal, or mixtures of both. It is understood that the different metal sulfites are not necessarily equivalent in the same or different treating composition.

As hereinbefore set forth, sulfur dioxide, when employed, may be bubbled into the alkali metal hydroxide solution, or into the water to be subsequently added to the alkali metal hydroxide. In still other cases, it may be bubbled directly into the treating zone, either continuously or intermittently and either before or during the treating operation. When a solid metal sulfite is used, it may be dissolved either in the alkaline reagent solution or in the water to be commingled with the alkaline reagent. In still other cases it may be introduced directly into the treating zone, either before or during the treating operation. However, it is understood that the sulfite ions may be introduced into the system in any suitable manner and that the above are merely suggested methods for accomplishing the incorporation of the sulfite ions.

In general the sulfite ions will be used in a concentration of from about 0.01% to about 1% by weight (determined as $SO_2$) of the alkaline reagent. When an alkaline reagent is not used as part of the reagent solution, it generally is preferred to use the alkali metal or alkaline earth metal sulfites, which will be used in a concentration of from about 0.01 to about 1% or more by weight (determined as $SO_2$) of the aqueous or other solvent used in the process.

The phthalocyanine catalyst is used in exceedingly small concentrations. These may range from 5 to 500 and preferably from 10 to 100 parts per million by weight of the active alkaline reagent in the solution, although lower or higher concentrations may be used in some cases. The use of higher concentrations are unnecessary in most cases but may be used if desired, and thus may range up to 25% or more by weight of the alkaline reagent.

As hereinbefore set forth, it generally is preferred to effect the sweetening in the presence of an alkaline reagent, sodium hydroxide solution being particularly preferred. However, in some cases, sweetening may be effected by dissolving the phthalocyanine catalyst and sulfite ions in an aqueous menstruum and utilizing this solution to effect oxidation of mercaptans by passing air or other suitable oxidizing agent through the mixture of solution and sour hydrocarbon distillate. The sulfite ions appear to increase the solubility of the phthalocyanine catalyst in water and thereby permits its satisfactory use in this manner.

Sweetening of the sour hydrocarbon distillate is effected by oxidation of mercaptans. Accordingly, an oxidizing agent is present in the reaction. Air is preferred, although oxygen or other oxygen-containing gas may be utilized. In some cases the sour petroleum distillate may contain entrained oxygen or air in sufficient concentration to accomplish the desired sweetening, but generally it is preferred to introduce air into the reaction. The amount of air must be sufficient to effect oxidation of mercaptans, although an excess thereof generally is not objectionable.

Sweetening of the petroleum distillate may be effected in any suitable manner and may be in a batch or continuous process. In a batch process the sour hydrocarbon distillate is introduced into a reaction zone containing the phthalocyanine catalyst, sulfite ions and alkaline reagent, and air is introduced therein or passed therethrough. Preferably the reaction zone is equipped with suitable stirrers or other mixing device to obtain intimate mixing. In a continuous process the caustic solution containing phthalocyanine catalyst and sulfite ions is passed countercurrently to an ascending stream of sour petroleum distillate in the presence of a continuous stream of air. In a mixed type process, the reaction zone contains the alkaline solution, sulfite ions and phthalocyanine catalyst, and gasoline and air are continuously passed therethrough and removed, generally from the upper portion of the reaction zone.

In general the sweetening reaction is effected at ambient temperature. In some cases, elevated temperature may be employed and generally will be within the range of from about 100° to about 400° F. or more, depending upon the pressure utilized therein, but usually below that at which substantial vaporization occurs.

As hereinbefore set forth, final sweetening of the gasoline may be preceded by extraction of acidic components and particularly mercaptans from the gasoline in any suitable manner. This pretreatment preferably comprises contacting of the gasoline with an alkaline solution, usually at ambient temperature and either in a batch or continuous process. In some cases elevated temperatures, which may range up to about 200° F., may be employed. The alkaline reagents and, when employed, solubilizer or solutizer as heretofore set forth generally are utilized in the pretreatment. Following this treatment, the petroleum distillate will not be sweet and is subjected to final sweetening in the presence of air, phthalocyanine catalyst and sulfite ions.

In most cases, the alkaline solution used to extract acidic components is subjected to regeneration to recover caustic solution for further use in the process. When desired, the caustic solution containing sulfite ions may be regenerated, either alone or in admixture with the caustic solution from the extraction step. Because of the presence of the phthalocyanine catalyst, the regeneration may be effected by oxidizing, and this is readily accomplished by air blowing, although oxygen or other suitable oxidizing agents may be employed. The oxidation is effected at ambient temperature, although temperatures up to about 200° F. or more may be employed, when desired. The sulfur dioxide liberated in the regeneration step will be removed in the overhead from the regeneration zone. Accordingly, it is desirable to commingle additional sulfite ions with the regenerated caustic solution containing phthalocyanine catalyst when it is to be used further for effecting the sweetening reaction.

The following examples are introduced to illustrate further the novelty and utility of the present invention but not with the intention of unduly limiting the same.

EXAMPLE I

The hydrocarbon distillate used in this example is a commercial J.P.–4 jet fuel having an original mercaptan content of 0.36% by weight. This fuel was evaluated in an activity test in which caustic solution containing 250 parts per million of cobalt phthalocyanine sulfonate was sprayed into an open tower containing the jet fuel. The caustic phase was withdrawn from the bottom of the tower and continuously recycled.

Three different caustic solutions were evaluated in the above manner. The caustic solutions contained respectively 3%, 10% and 30% by weight of sodium hydroxide and the remainder was water. Each solution contained 250 parts per million of cobalt phthalocyanine sulfonate based on the solution.

In another series of tests, 1% by weight of sodium bisulfite ($Na_2HSO_3$) (determined as $SO_2$ and based on the sodium hydroxide in the solution) was incorporated in each of the caustic solutions containing the phthalocyanine catalyst.

Table I reports the mercaptan content of the jet fuel after 24 hours recycle operation for each of the six runs.

Table I

| Caustic Strength | 3% | | 10% | | 30% | |
|---|---|---|---|---|---|---|
| | No Sulfite | Sulfite Added | No Sulfite | Sulfite Added | No Sulfite | Sulfite Added |
| Percent Mercaptan Sulfur | 0.010 | 0.008 | 0.010 | 0.0076 | 0.014 | 0.0056 |

From the data in the above table, it will be noted that the cobalt phthalocyanine catalyst was effective in reducing the mercaptan content of the jet fuel from 0.36% to about 0.01% by weight. Also, it will be noted that the addition of the sulfite ions served to reduce the mercaptan sulfur content to 0.008% by weight and lower. Thus, it is seen that the sulfite ions served to further improve the activity and stability of the phthalocyanine catalyst.

EXAMPLE II

This example reports the results using a different commercial jet fuel which had an original mercaptan content of 0.056% by weight. The caustic solution contained 10% by weight of sodium hydroxide and the remainder water. 250 parts per million by weight of cobalt phthalocyanine sulfonate were incorporated in the caustic solution along with 1% by weight of potassium metabisulfite ($K_2S_2O_5$).

When evaluated by an activity test in which equal volumes of caustic and jet fuel are mixed for five minutes in a separatory funnel, the mercaptan content of the jet fuel was reduced as shown in Table II.

*Table II*

| Time, hours: | Mercaptan sulfur, percent |
|---|---|
| 6 | 0.0256 |
| 13 | 0.0310 |
| 21 | 0.0345 |

From the data in the above table, it will be seen that the phthalocyanine catalyst containing the sulfite ions was effective over a period of 21 hours to reduce the sulfur content of the jet fuel from 0.056% to less than 0.035% by weight.

In the absence of the sulfite ions, the mercaptan content after 21 hours is greater than 0.035% by weight with this particular jet fuel in this particular test.

EXAMPLE III

The data in these results were obtained when treating a No. 2 commercial fuel oil having an API gravity of 35.8° and a boiling range of from 360° to 632° F. The caustic solution used in this example was 10° Baumé and, when employed, contained 100 parts per million of cobalt phthalocyanine sulfonate. The evaluations were made by mixing the reagent with the fuel oil and shaking for ten minutes, after which time the mercaptan sulfur content of the fuel oil was determined.

The untreated fuel oil had a mercaptan content of 0.039% by weight. When treated with used caustic solution of 10° Baumé (previously used in a commercial plant for extracting acidic components), the mercaptan sulfur content of the treated fuel oil was 0.026% by weight. When another sample of the fuel oil was treated with another portion of the used caustic solution to which 100 parts per million of cobalt phthalocyanine sulfonate was added, the mercaptan sulfur content of the fuel oil was 0.021% by weight. Another portion of the fuel oil was treated with another portion of the used caustic solution containing 100 parts per million of cobalt phthalocyanine sulfonate and 0.1% by weight of sodium hydrogen sulfite and this served to reduce the mercaptan sulfur content down to 0.014% by weight. Here again it will be noted that the sulfite ions served to further improve the activity of the phthalocyanine catalyst.

EXAMPLE IV

Cracked gasoline having a mercaptan sulfur content of 0.005% by weight is subjected to sweetening by being passed countercurrently to a descending stream of 15° Baumé of a potassium hydroxide solution containing 50 parts per million of vanadium phthalocyanine sulfonate and 0.5% by weight of potassium sulfite hydrate ($K_2SO_3.2H_2O$). Air is introduced into the lower portion of the treating zone. The treating is effected at ambient temperature. The treated gasoline withdrawn from the treating zone is doctor sweet.

I claim as my invention:

1. In the removal of mercaptans from sour hydrocarbon distillate by oxidation thereof in the presence of a phthalocyanine catalyst, the method of retarding deactivation of the phthalocyanine catalyst which comprises adding sulfite ions to the reaction mixture.

2. In the removal of mercaptans from sour hydrocarbon distillate by oxidation thereof in the presence of a mixture of an alkaline reagent and a phthalocyanine catalyst, the method of retarding deactivation of the phthalocyanine catalyst which comprises adding sulfite ions to said mixture.

3. In the removal of mercaptans from sour hydrocarbon distillate by oxidation thereof in the presence of a mixture of an alkaline reagent and cobalt phthalocyanine sulfonate, the method of retarding deactivation of the phthalocyanine sulfonate which comprises adding sulfite ions to said mixture.

4. The method of claim 2 further characterized in that said sulfite ions are introduced by bubbling sulfur dioxide gas into the alkaline reagent.

5. The method of claim 2 further characterized in that said sulfite ions are introduced as a sodium hydrogen sulfite.

References Cited in the file of this patent
UNITED STATES PATENTS

| | | |
|---|---|---|
| 164,694 | Schmidt | June 22, 1875 |
| 1,540,218 | Maloney | June 2, 1925 |
| 1,993,140 | Hamilton et al. | Mar. 5, 1935 |
| 2,028,998 | Schulze et al. | Jan. 28, 1936 |
| 2,174,810 | Von Fuchs et al. | Oct. 3, 1939 |
| 2,882,224 | Gleim et al. | Apr. 14, 1959 |